United States Patent
Idikurt et al.

(10) Patent No.: US 12,040,442 B2
(45) Date of Patent: Jul. 16, 2024

(54) ELECTROCHEMICAL BATTERY CELL FOR A BATTERY MODULE, PROCESS FOR MANUFACTURING A BATTERY CELL, AND BATTERY MODULE

(71) Applicant: Bayerische Motoren Werke Aktiengesellschaft, Munich (DE)

(72) Inventors: Tuncay Idikurt, Munich (DE); Christoph Klaus, Oberschleissheim (DE); Daniel Scherer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 215 days.

(21) Appl. No.: 16/727,140

(22) Filed: Dec. 26, 2019

(65) Prior Publication Data
US 2020/0136109 A1    Apr. 30, 2020

Related U.S. Application Data

(63) Continuation of application No. PCT/EP2018/066928, filed on Jun. 25, 2018.

(30) Foreign Application Priority Data

Jun. 27, 2017   (DE) ..................... 10 2017 210 744.8

(51) Int. Cl.
*H01M 10/0525*   (2010.01)
*H01M 50/209*   (2021.01)

(52) U.S. Cl.
CPC ..... *H01M 10/0525* (2013.01); *H01M 50/209* (2021.01); *H01M 2220/20* (2013.01)

(58) Field of Classification Search
None
See application file for complete search history.

(56) References Cited

U.S. PATENT DOCUMENTS

| 5,756,227 A | 5/1998 | Suzuki et al. |
| 2013/0252063 A1 | 9/2013 | Park |

(Continued)

FOREIGN PATENT DOCUMENTS

| CN | 103325977 A | 9/2013 |
| CN | 103633262 A | 3/2014 |

(Continued)

OTHER PUBLICATIONS

International Search Report (PCT/ISA/210) issued in PCT Application No. PCT/EP2018/066928 dated Aug. 22, 2018 with English translation (five (5) pages).

(Continued)

*Primary Examiner* — Dustin Q Dam
(74) *Attorney, Agent, or Firm* — Crowell & Moring LLP

(57) ABSTRACT

An electrochemical battery cell for a battery module for an electrically drivable motor vehicle, includes a cell housing and a spacer element which is secured to one housing face of the cell housing in order to be supported in an electrically insulating manner on an adjacent cell housing at a distance therefrom. The spacer element includes an electrically insulating insulation layer that is fastened to the housing face of the cell housing, and, for supporting purposes, a tolerance compensating layer which is fastened to the insulation layer and projects therefrom.

6 Claims, 2 Drawing Sheets

(56) References Cited

U.S. PATENT DOCUMENTS

| | | | |
|---|---|---|---|
| 2015/0140388 A1* | 5/2015 | Harada | H01M 10/656 |
| | | | 429/120 |
| 2016/0126514 A1 | 5/2016 | Suzuki et al. | |
| 2016/0308186 A1 | 10/2016 | Han | |
| 2017/0077566 A1* | 3/2017 | Mascianica | H01M 50/507 |
| 2017/0222199 A1 | 8/2017 | Idikurt et al. | |
| 2018/0123101 A1* | 5/2018 | Maguire | B60K 1/04 |

FOREIGN PATENT DOCUMENTS

| | | |
|---|---|---|
| CN | 106058089 A | 10/2016 |
| CN | 106415878 A | 2/2017 |
| CN | 106573548 A | 4/2017 |
| DE | 10 2012 214 964 A1 | 3/2014 |
| DE | 10 2014 221 493 A1 | 4/2016 |
| DE | 10 2014 225 233 A1 | 6/2016 |
| DE | 10 2016 009 972 A1 | 2/2017 |
| KR | 10-2006-0085775 A | 7/2006 |
| WO | WO 2016/091445 A1 | 6/2016 |

OTHER PUBLICATIONS

German-language Written Opinion (PCT/ISA/237) issued in PCT Application No. PCT/EP2018/066928 dated Aug. 22, 2018 (six (6) pages).

German-language Search Report issued in counterpart German Application No. 10 2017 210 744.8 dated Feb. 6, 2018 with partial English translation (15 pages).

Chinese-language Office Action issued in Chinese Application No. 201880042865.0 dated Nov. 16, 2021 with English translation (17 pages).

Chinese-language Office Action issued in Chinese Application No. 201880042865.0 dated Jun. 28, 2022 with English translation (20 pages).

* cited by examiner

ELECTROCHEMICAL BATTERY CELL FOR A BATTERY MODULE, PROCESS FOR MANUFACTURING A BATTERY CELL, AND BATTERY MODULE

CROSS REFERENCE TO RELATED APPLICATIONS

This application is a continuation of PCT International Application No. PCT/EP2018/066928, filed Jun. 25, 2018, which claims priority under 35 U.S.C. § 119 from German Patent Application No. 10 2017 210 744.8, filed Jun. 27, 2017, the entire disclosures of which are herein expressly incorporated by reference.

BACKGROUND AND SUMMARY OF THE INVENTION

The invention relates to an electrochemical battery cell for a battery module for an electrically drivable motor vehicle, having a cell housing and a spacer element secured to a housing side of the cell housing in order to be supported at a distance and in an electrically insulating manner on an adjacent cell housing. The invention furthermore relates to a method for producing such a battery cell and to a battery module for the electrically drivable motor vehicle, having a number of such battery cells.

Motor vehicles that are driven or can be driven electrically or by electric motor, such as electric or hybrid vehicles for example, usually comprise an electric motor by way of which one or both vehicle axles can be driven. For the purpose of supplying electrical energy, the electric motor is typically coupled to a (high-voltage) battery as an electrical energy store within the vehicle. Such batteries are embodied, for example, as rechargeable batteries, wherein, to generate a sufficiently high operating voltage, a plurality of individual batteries are typically interconnected in a modular manner to form a joint battery system.

The individual battery modules usually comprise a number of electrochemical battery cells, which are arranged alongside one another or stacked within a respective, in particular prismatic or prism-shaped, battery housing or cell housing along a pack or stacking direction to form a cell pack or a cell stack. In this case, the battery cells are often embodied as lithium ion battery cells.

In this case, it is contemplated, for example, in order to produce the battery module, for the battery cells to be adhesively bonded to one another extensively on their housing sides that face one another and then to be compressed by means of pressure plates with distance control and force monitoring, so that the cell housings bear directly against one another over the full area and therefore form a compressed cell pack. The pressure plates are connected, for example, to tie rods, as a result of which the compressed cell pack is clamped by way of a circumferential frame and in this way held in a defined form. It is disadvantageous that, during operation, on account of aging processes and charging and/or discharging processes, volume changes (cell breathing) of the battery cells arise, as a result of which additional pressures or forces act in the structure of the cell stack, which can lead to damage or complete destruction of one or more battery cells.

DE 10 2014 221 493 A1 discloses a battery module for a motor vehicle that can be driven or is driven by electric motor, in which the cell housings of the battery cells are provided on a housing side with a spacer element, which is supported by means of a contact surface on the respective opposite housing side of an adjacent cell housing. The contact surface is in this case smaller than the surface area of the housing side, with the result that a portion of the respective housing side is unsupported. The force required to compress the cell pack is transmitted via the contact surface to the individual battery cells by way of the pressure plates. The non-supported portion or region of the respective housing side in this case acts to balance and compensate for forces and tolerances. The battery cells are supported in a manner physically spaced apart from one another and electrically insulated from one another by way of the spacer elements.

The invention is based on the object of providing a particularly suitable electrochemical battery cell for a battery module. The invention is furthermore based on the object of providing a suitable method for producing such a battery cell. The invention is also based on the object of providing a battery module for a motor vehicle that can be driven or is driven by electric motor having a number of such battery cells.

The battery cell according to the invention is suitable and configured for a battery module for a motor vehicle that can be driven or is driven by electric motor (electrically), in particular an electric or hybrid vehicle. In this case, the battery cell is embodied, in particular, as a lithium ion cell having a cell housing with an, in particular, prismatic housing shape. On a housing side of the cell housing, in particular on a (housing) end side or side surface, the battery cell has a spacer element in order to be supported at a physical distance and in an electrically insulating manner on a cell housing that is arranged or can be arranged adjacent, or on a pressure plate. A housing side (end side, side surface) is to be understood here, in particular, as meaning one of the two largest housing surfaces of the prismatic cell housing.

According to the invention, the spacer element is embodied in a multi-part manner. In this case, the spacer element has an electrically insulating insulation layer secured to the housing side of the cell housing. The insulation layer is made of an electrically non-conductive material, for example a plastic film, and is preferably applied over the full surface of the housing side. The spacer element furthermore has a tolerance compensation layer secured to the extensive insulation layer and projecting therefrom. The tolerance compensation layer therefore laterally projects beyond the cell housing in the region of the housing side in order to be supported, in particular distance and/or force compensation is hereby realized in a (battery cell) structure of a cell pack of the battery module. In other words, the tolerance compensation layer forms the contact surface for support on an adjacent cell housing or on a pressure plate. As a result, a particularly suitable battery cell is realized.

In one possible embodiment, the tolerance compensation layer is produced from a foamed plastic material, such as, for example, an acrylate foam or a polyethylene foam (PE foam). The insulation layer is produced in this case, for example, from an electrically non-conductive plastic material, such as polyethylene terephthalate (PET), PE or polypropylene (PP).

In contrast to the prior art, the spacer element of the battery cell is therefore not formed in one piece, that is to say monolithically or in one part, but instead has a multi-part, separately coated design with the insulation layer and with the tolerance compensation layer. As a result, the production of the spacer element is simplified and therefore costs are reduced.

The contact surface of the tolerance compensation layer is preferably smaller than the surface area of the insulation layer or the housing side. In this case, the tolerance compensation layer of the spacer element is preferably suitable and designed to absorb the pressure caused by the changes in volume in the case of cell breathing.

In other words, the tolerance compensation layer is embodied, for example, to be mechanically stable enough that no deformation occurs in the course of such pressure or force action. As a result, full-area contact and pressing of the battery cells in a battery module is advantageously and easily prevented, with the result that the non-supported or exposed portion or region of the respective housing side can expand in the course of cell breathing or cell aging. A structurally simple and reliable compensation of forces or pressures arising during operation and (manufacturing) tolerances is therefore made possible. This means that the tolerance compensation layer causes mechanical spacing or support with respect to an adjacent cell housing, wherein at the same time non-mechanical distance and/or force compensation for the adjacent or flanking cell housing is produced.

In an advantageous development, the insulation layer and/or the tolerance compensation layer are adhesively bonded in order to be secured. In other words, the insulation layer has, for example, an adhesive layer secured to the housing side, that is to say an adhesive coating. The tolerance compensation layer is suitably provided in order to be secured to the insulation layer with a correspondingly extensive adhesive layer. As a result, a particularly low-outlay, operationally secure and slip-free securing of the spacer element to the cell housing is realized, as a result of which a battery cell that is particularly simple to produce is formed. This consequently advantageously translates to a reduction in the production costs of the battery cell.

In a suitable embodiment, the insulation layer and/or the tolerance compensation layer are produced from a respective endless material. In this case, an endless material is to be understood as meaning, in particular, a material with a substantially arbitrary length, with the result that essentially as many insulation layers and tolerance compensation layers as desired are able to be produced from a single endless material. This means that the length of the endless material is embodied to be virtually endless in comparison to the width or height thereof. In other words, the length of the endless material is a high multiple of the height or width thereof. The endless material embodied, for example, as material sold by the meter is in this case suitably stored on an (endless) roll or rod and is fed to a production plant during production continuously, that is to say substantially without interruption. The insulation layer and/or the tolerance compensation layer are suitably manufactured from the respective film-like or ribbon-like endless material as cut lengths, punched-out portions or cuttings. This ensures particularly cost-effective production. Furthermore, particularly flexible adjustment of the spacer element to different cell housing dimensions and/or to a desired support geometry is able be realized.

In an expedient design, the tolerance compensation layer has a greater layer thickness than the insulation layer. As a result, the tolerance compensation layer projects above the insulation layer—and therefore the housing side—in a protrusion-like manner, wherein a protrusion height formed by the layer thickness of the tolerance compensation layer determines the physical spacing or the clear width between two adjacent cell housings. This ensures a defined physical spacing of the cell housing.

In one possible development, the toleration compensation layer is formed as at least one elongate, strip-like or strip-shaped spacer strip. As a result, an expedient tolerance compensation layer with respect to support and with respect to distance and/or force compensation is formed.

In an alternative form of development, the toleration compensation layer is designed, for example, in the manner of a ring in the form of a collar surrounding the edge side of the insulation layer or the housing side.

In an expedient design, the tolerance compensation layer is formed as precisely two spacer strips spaced apart from and parallel to one another. As a result, a particularly expedient tolerance compensation layer for the purpose of support is realized, wherein, in particular, the (hollow) space exposed between the spacer strips is suitable and configured as an expansion space for the distance and/or force compensation.

In a preferred embodiment, the or each spacer strip is oriented parallel to a longitudinal side of the cell housing. This ensures a homogenous introduction of force in the case of compression of the battery cells in the course of cell pack production. The force transmission during compression takes place here, in particular, in the region of the longitudinal-side edges of the housing side or the cell housing. This means that the greatest possible distance and/or force compensation is made possible, since the contact or support of the or each spacer strip of the tolerance compensation layer is effected at the edge side, and therefore a particularly large expansion space is formed.

Alternatively, it is likewise contemplated, for example, that the or each spacer strip is applied in a manner oriented transverse to the longitudinal side of the cell housing, that is to say, in particular, along a narrow side. A diagonal alignment of the or each spacer strip on the housing side is likewise possible. Essentially, an arbitrary arrangement of the spacer strips is possible, with the result that a particularly high flexibility with respect to the geometric design of the tolerance compensation layer is realized.

In the method according to the invention for producing a battery cell, an insulation layer is cut from a first endless material of a first endless roll and applied, in particular adhesively bonded, to a housing side of an, in particular prismatic, cell housing. Subsequently, a tolerance compensation layer is cut from a second endless material of a second endless roll and applied, in particular adhesively bonded, to the insulation layer and/or to the housing side of the cell housing. The cutting and application of the insulation layer and of the tolerance compensation layer is preferably effected here as a high-speed process. As a result, a particularly suitable production method is realized.

The method is suitable and configured, in particular, with respect to a simple production of the layers of the spacer element. The extensive insulation layer is preferably cut from the large first endless roll depending on the size of the pressure side or housing side of the cell housing. In this case, the tolerance compensation layer is provided as a second endless material over the second endless roll. The cut to a corresponding battery cell is preferably effected here "in line", that is to say in a substantially continuous non-stop operation. The application is preferably effected on the assembly line, in particular by means of at least one custom machine in a high-speed process.

The battery module according to the invention is suitable and configured for a motor vehicle that can be driven or is driven by electric motor (electrically), in particular an electric or hybrid vehicle. The battery module has a cell pack or a cell stack having a number of electrochemical battery cells described above, which are arranged alongside one another along a pack direction (stacking direction) between two pack-end-side pressure plates. The battery cells are embodied, in particular, as lithium ion cells with a prismatic housing shape. In other words, the battery cells are each flanked on both sides by a battery cell or a pressure plate along the pack direction. Each battery cell of the cell pack is in this case supported spaced apart on a cell housing of a respective battery cell arranged adjacent or on one of the pressure plates.

To form a battery module of an electric or electromotive motor vehicle, a plurality of battery cells are, for example, arranged next to one another in the cell pack. In one possible application, for example, between 10 and 30 battery cells are arranged next to one another here as a cell pack of the battery module.

By using the battery cells according to the invention, a respective spacer element of multi-part design is in this case arranged between two adjacent battery cells and the adjacent pressure plates. As a result, distance and/or force compensation for all of the battery cells of the cell pack is formed, as a result of which it is ensured that the increasing force over the running time of the battery module on account of aging-related expansions or changes in volume of the battery cells can be compensated for sufficiently. Damage or destruction of the battery cells in the clamped cell pack of the battery module is therefore essentially completely prevented.

Other objects, advantages and novel features of the present invention will become apparent from the following detailed description of one or more preferred embodiments when considered in conjunction with the accompanying drawings.

Parts and sizes corresponding to one another are always provided with the same reference signs in all of the figures.

DETAILED DESCRIPTION OF THE DRAWINGS

Figure 1:
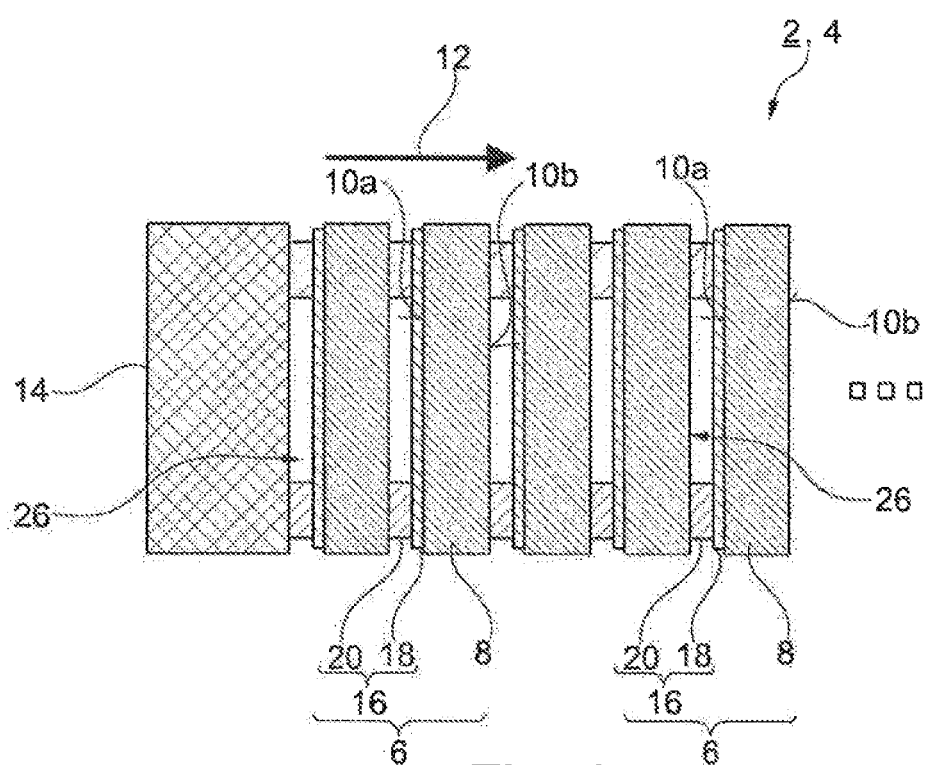
FIG. 1 shows a detail of a battery module of an electrically driven motor vehicle having a cell pack having a number of battery cells.

FIG. 1 illustrates a battery module 2 of an energy store of a motor vehicle that is driven or can be driven electrically by electric motor, in particular an electric or hybrid vehicle, which energy store is inside the vehicle. To generate a sufficiently high operating voltage, the battery module 2 has a cell stack or a cell pack 4 having a number of electrochemical battery cells 6. In this case, the battery cells 6 are embodied as rechargeable batteries, for example as lithium ion cells, having a cell housing 8 with a prismatic housing shape, in particular in a BEV, PHEV or PHEV2 cell format.

The battery cells 6 of the cell pack 4, which are provided with reference signs in the figures purely by way of example, are arranged alongside one another on their respective end-side housing sides 10a, 10b along a stacking or pack direction 12. The cell pack 4 is held under a specific axial pretension along the pack direction 12 by way of two pressure plates 14 arranged opposite one another and, in the assembled state, is inserted in a frame-like or frame-shaped pack housing of the battery module 2, which is not shown in more detail.

Figure 2:
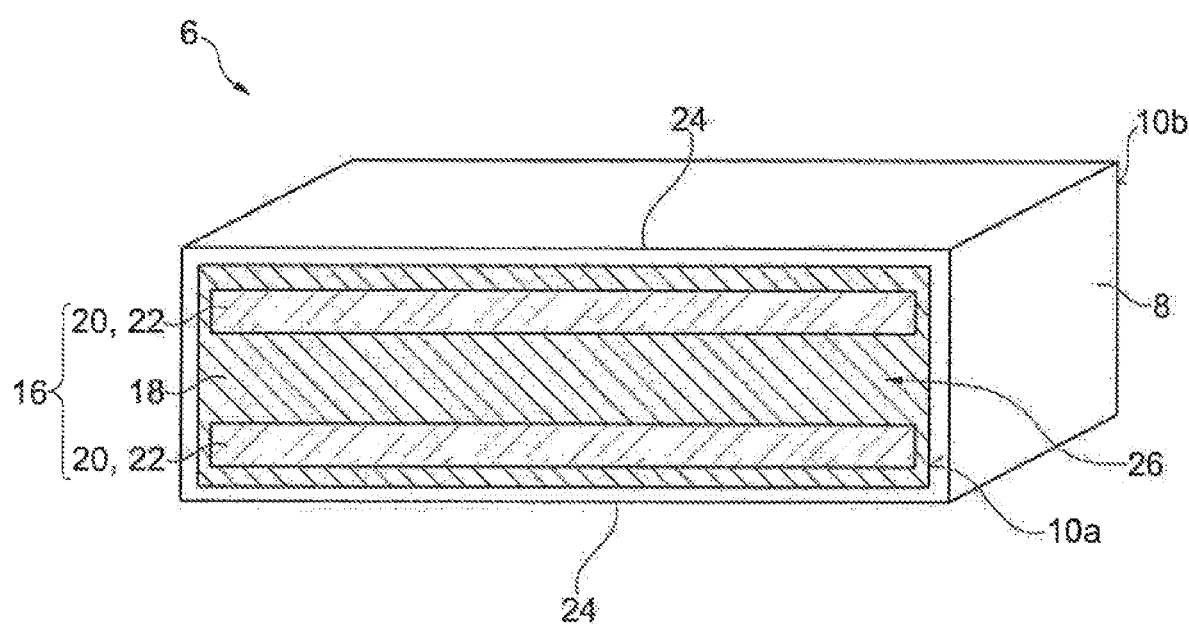
FIG. 2 shows a battery cell having a spacer element according to a first embodiment.

FIG. 2 perspectively illustrates an individual battery cell 6 of the cell pack 4. The battery cell 6 has on the housing side 10a a spacer element 16 in order to be supported at a physical distance and in an electrically insulating manner on a cell housing 8 that is arranged adjacent in the cell pack 4, in particular on the respective housing side 10b, or on the pressure plate 14.

In this case, the spacer element 16 is embodied in a multi-part manner. The spacer element 16 has an electrically insulating insulation layer 18 secured to the housing side 10a of the cell housing 8. The insulation layer 18 is made of an electrically non-conductive material, for example a plastic film, and is applied substantially to the full area of the housing side 10a.

On the extensive insulation layer 18, a tolerance compensation layer 20 that axially projects beyond same is applied and secured along the pack direction 12. As can be seen, in particular, in the schematic transverse illustration of FIG. 1, the tolerance compensation layer 20 therefore projects laterally beyond the cell housing 8 in the region of the housing side 10a for the purpose of support. In particular, direction and/or force compensation in the (battery cell) structure of the cell pack 4 of the battery module 2 is realized as a result.

In the exemplary embodiment of FIG. 2, the tolerance compensation layer 20 is embodied in the form of two elongate spacer strips 22. In this case, the spacer strips 22 are arranged on the edge side along a respective longitudinal side 24 of the housing side 10a. In other words, the spacer strips 22 are arranged spaced apart from and parallel to one another on the opposite longitudinal sides 24 of the housing side 10a.

The insulation layer 18 and the tolerance compensation layer 20 and the spacer strips 22 are preferably produced from a respective endless material. To this end, for example, the, in particular film-like, insulation layer 18 is cut to the dimensions of the housing side 10a and applied by way of an adhesive layer to the full surface area of the housing side 10a in a materially bonded manner. Subsequently, the spacer strips 22 of the tolerance compensation layer 20 are cut and applied by way of a respective adhesive layer to the surface of the insulation layer 18 in a materially bonded manner.

In the assembled state (FIG. 1), a hollow space 26 is therefore formed between the two spacer strips 22 on the one hand and between the housing side 10a and the adjacent housing side 10b (or the adjacent pressure plate 14). For this purpose, the tolerance compensation layer 20—as can be seen, in particular, in FIG. 1—has a substantially greater layer thickness compared to the insulation layer 18. In other words, the tolerance compensation layer 20 is dimensioned to be larger axially along the pack direction 12 than the insulation layer 18. In the hollow space 26 therefore formed, the respective battery cell 6, in particular the respective adjacent or flanking (neighboring) battery cell 6, can extend during operation of the battery module 2 when an extent or change in volume of the corresponding battery cell 6 occurs. Distance and/or force compensation during operation of the battery module 2 is therefore realized, which advantageously translates to the lifetime and range of the motor vehicle.

Figure 3:
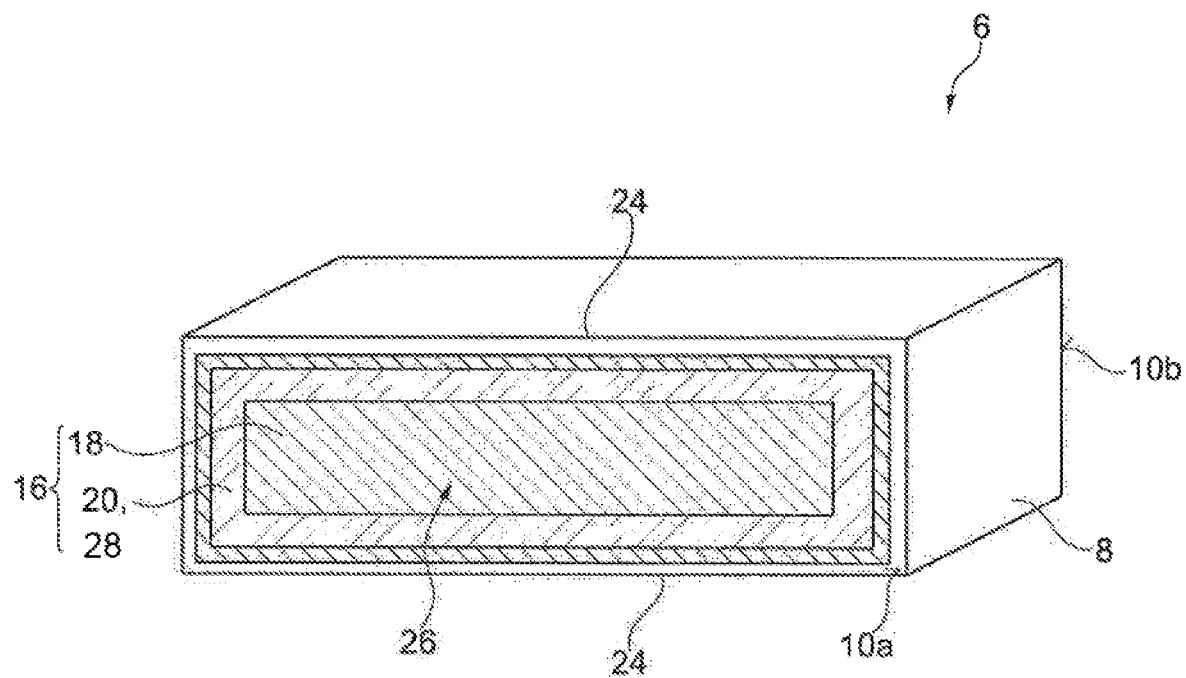
FIG. 3 shows the battery cell having the spacer element according to a second embodiment.

FIG. 3 shows an alternative embodiment of the spacer element 16. In this embodiment, the tolerance compensation layer 20 is formed as an approximately ring-like spacer edge 28 that encircles on the edge side, which spacer edge surrounds or encloses the hollow space 26. As a result, more stable support in the cell pack 4 is realized.

The invention is not restricted to the exemplary embodiments described above. Rather, other variants of the invention may also be derived therefrom by a person skilled in the art without departing from the subject matter of the invention. In particular, it is furthermore the case that all individual features described in conjunction with the exemplary embodiments may also be combined with one another in some other way without departing from the subject matter of the invention.

LIST OF REFERENCE SIGNS

2 Battery module
4 Cell pack
6 Battery cell
8 Cell housing
10a, 10b Housing side
12 Pack direction
14 Pressure plate
16 Spacer element
18 Insulation layer
20 Tolerance compensation layer
22 Spacer strip
24 Longitudinal side
26 Hollow space
28 Spacer edge The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery module for an electrically drivable motor vehicle, comprising:
 a cell pack having a number of electrochemical battery cells, which are arranged alongside one another along a pack direction between two pack-end-side pressure plates, wherein
 each battery cell of the cell pack is supported spaced apart on a cell housing of a respective battery cell arranged adjacent or on one of the two pack-end-side pressure plates, wherein
 each battery cell comprises:
  a cell housing having a prismatic housing shape; and
  a spacer element secured to a first housing side of the cell housing in order to be supportable in an electrically insulating manner on an adjacent cell housing at a distance therefrom, the adjacent cell housing having a prismatic shape, the spacer element thereby being disposed between adjacent cell housings,
 the spacer element has an electrically insulating insulation layer secured to the first housing side of the cell housing and a tolerance compensation layer secured to the electrically insulating insulation layer on the first housing side and projecting therefrom for purpose of support, where a contact surface of the tolerance compensation layer on the adjacent cell housing is smaller than a surface area of the electrically insulating insulation layer on the first housing side, wherein the tolerance compensation layer has a greater layer thickness than that of the insulation layer, wherein the electrically insulating insulation layer secured to the first housing side of the cell housing is disposed only on the first housing side, and wherein
 the electrically insulating insulation layer comprises a plastic film,
 the tolerance compensation layer comprises a plastic foam,
 the tolerance compensation layer is formed as two separate spacer strips spaced apart from and parallel to one another on the first housing side,
 the cell pack includes a plurality of the spacer elements, and
 the cell pack includes two pack-end-side spacer elements, the two pack-end-side pressure plates being in contact with the pack-end-side spacer elements.

2. The battery module according to claim 1, wherein the insulation layer and/or the tolerance compensation layer is adhesively bonded in order to be secured.

3. The battery module according to claim 1, wherein the first housing side is a longitudinal side of the cell housing, and wherein
 each of the two separate spacer strips is oriented parallel to the longitudinal side.

4. The battery module according to claim 1, wherein the plastic foam is selected from the group consisting of an acrylate foam and a polyethylene foam.

5. The battery module according to claim 1, wherein the plastic film comprises an electrically non-conductive plastic material selected from the group consisting of polyethylene terephthalate, polyethylene, and polypropylene.

6. The battery module according to claim 1, wherein the electrically insulating insulation layer is applied over a full surface of the first housing side.

* * * * *